United States Patent
Suzuki et al.

(10) Patent No.: US 10,909,848 B2
(45) Date of Patent: Feb. 2, 2021

(54) DRIVING ASSISTANCE DEVICE

(71) Applicant: DENSO CORPORATION, Kariya (JP)

(72) Inventors: Tadao Suzuki, Kariya (JP); Junichiro Funabashi, Kariya (JP); Motonori Ando, Kariya (JP)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 16/060,998

(22) PCT Filed: Sep. 26, 2016

(86) PCT No.: PCT/JP2016/078142
§ 371 (c)(1),
(2) Date: Jun. 11, 2018

(87) PCT Pub. No.: WO2017/104209
PCT Pub. Date: Jun. 22, 2017

(65) Prior Publication Data
US 2018/0365990 A1 Dec. 20, 2018

(30) Foreign Application Priority Data
Dec. 14, 2015 (JP) ................ 2015-243354

(51) Int. Cl.
| G08G 1/0969 | (2006.01) |
| G08G 1/16 | (2006.01) |
| G01C 21/36 | (2006.01) |
| G08G 1/0967 | (2006.01) |
| B60W 30/095 | (2012.01) |
| G01C 21/30 | (2006.01) |

(52) U.S. Cl.
CPC ....... *G08G 1/0969* (2013.01); *B60W 30/0956* (2013.01); *G01C 21/30* (2013.01);
(Continued)

(58) Field of Classification Search
CPC . G08G 1/0969; B60W 30/0956; B01C 21/30; B01C 21/3697; B01C 21/096716;
(Continued)

(56) References Cited

U.S. PATENT DOCUMENTS

| 5,357,438 A | * | 10/1994 | Davidian | G01S 13/931 701/301 |
| 5,566,074 A | * | 10/1996 | Hammer | G05D 1/0808 701/301 |

(Continued)

FOREIGN PATENT DOCUMENTS

| JP | 4324600 A | 11/1992 |
| JP | 2001084496 A | 3/2001 |

(Continued)

*Primary Examiner* — Krishnan Ramesh
(74) *Attorney, Agent, or Firm* — Harness, Dickey & Pierce, P.L.C.

(57) ABSTRACT

A driving assistance device for a vehicle includes: an assistance processing portion that executes a notification of a possibility of a host vehicle intersecting with an other vehicle based on host vehicle information including information that provides an estimation of a travelling course of the host vehicle and an other vehicle information including information that provides an estimation of a travelling course of the other vehicle and acquired by wireless communication; and a map acquisition portion that acquires map data including data that specifies a circular intersection. The host vehicle information includes a position of the host vehicle. The assistance processing portion prevents the notification based on the circular intersection, which is disposed in front of the host vehicle in the travelling course of the host vehicle, according to at least the host vehicle information and the map data acquired by the map acquisition portion.

9 Claims, 11 Drawing Sheets

(52) U.S. Cl.
CPC ... *G01C 21/3697* (2013.01); *G08G 1/096716* (2013.01); *G08G 1/096758* (2013.01); *G08G 1/096775* (2013.01); *G08G 1/096783* (2013.01); *G08G 1/16* (2013.01); *G08G 1/163* (2013.01)

(58) Field of Classification Search
CPC .... B01C 21/096758; B01C 21/096783; B01C 21/16; B01C 21/163
USPC ........................................................ 701/533
See application file for complete search history.

(56) References Cited

U.S. PATENT DOCUMENTS

| | | |
|---|---|---|
| 2004/0210383 A1 | 10/2004 | Sato |
| 2005/0231384 A1 | 10/2005 | Shimotani |
| 2008/0189039 A1* | 8/2008 | Sadekar ........... G08G 1/096741 701/301 |
| 2010/0256909 A1* | 10/2010 | Duggan ............. G08G 5/0069 701/301 |
| 2016/0071417 A1* | 3/2016 | Lewis .................... G08G 1/162 701/301 |
| 2017/0008444 A1* | 1/2017 | Bopp ....................... B60Q 9/00 |
| 2017/0019524 A1* | 1/2017 | Kohler .................. H04W 4/023 |
| 2019/0001993 A1* | 1/2019 | Visintainer ....... B60W 30/0953 |

FOREIGN PATENT DOCUMENTS

| | | |
|---|---|---|
| JP | 2003065781 A | 3/2003 |
| JP | 2005301884 A | 10/2005 |
| JP | 2007309756 A | 11/2007 |
| JP | 2008101919 A | 5/2008 |
| JP | 2010165021 A | 7/2010 |
| JP | 2012088904 A | 5/2012 |
| JP | 2012128714 A | 7/2012 |

* cited by examiner

DRIVING ASSISTANCE DEVICE

CROSS REFERENCE TO RELATED APPLICATIONS

This application is a U.S. National Phase Application under 35 U.S.C. 371 of International Application No. PCT/JP2016/078142 filed on Sep. 26, 2016 and published in Japanese as WO 2017/104209 A1 on Jun. 22, 2017. This application is based on and claims the benefit of priority from Japanese Patent Application No. 2015-243354 filed on Dec. 14, 2015. The entire disclosures of all of the above applications are incorporated herein by reference.

TECHNICAL FIELD

The present disclosure relates to a driving assistance device that provides driving assistance using information acquired by communicating wirelessly.

BACKGROUND ART

A known type of driving assistance device provides driving assistance that is related to passage through an intersection by using information on another vehicle acquired by communicating wirelessly. For example, Patent Literature 1 discloses a driving assistance device that determines whether a host vehicle is likely to intersect with another vehicle in an intersection on the basis of the other vehicle information including vehicle acceleration acquired using vehicle-to-vehicle communication and the host vehicle information including starting/stopping, a direction indicator signal, and vehicle speed and, if the vehicles are likely to intersect with each other, provides a notification such as a sound alert.

However, the driving assistance device disclosed in Patent Literature 1 is problematic in that it may provide a false notification if the intersection is a circular intersection. See below for the details.

If it is determined, based on the vehicle information from the host vehicle and the other vehicle, that the host vehicle is likely to intersect with the other vehicle in an intersection where roads cross at the same level, the host vehicle is in fact likely to intersect with the other vehicle in the intersection. If, however, such determination is made at a circular intersection, the host vehicle is unlikely to intersect with the other vehicle in the intersection from the standpoint of the structure of the intersection where the traffic flows in one direction in the circular portion of the intersection. The technique disclosed in Patent Literature 1 thus poses a problem that it may provide a false alert at a circular intersection where the host vehicle is unlikely to intersect with the other vehicle from the standpoint of the structure of the intersection.

PRIOR ART LITERATURES

Patent Literature

Patent Literature 1: JP 2012-88904-A

SUMMARY

It is an object of the present disclosure to provide a driving assistance device that provides driving assistance that is related to the passage through an intersection and prevents a false notification from being provided.

According to a first aspect of the present disclosure, a driving assistance device for a vehicle includes: an assistance processing portion that executes a notification of a possibility of a host vehicle intersecting with an other vehicle based on host vehicle information and an other vehicle information, the host vehicle information being vehicle information including information that provides an estimation of a travelling course of the host vehicle, and the other vehicle information being vehicle information including information that provides an estimation of a travelling course of the other vehicle and being acquired by wireless communication; and a map acquisition portion that acquires map data including data that specifies a circular intersection. The host vehicle information includes a position of the host vehicle. The assistance processing portion prevents the notification based on the circular intersection, which is disposed in front of the host vehicle in the travelling course of the host vehicle, according to at least the host vehicle information and the map data acquired by the map acquisition portion.

The driving assistance device described above can determine whether a circular intersection exists in the course of the host vehicle forward of the host vehicle using at least the host vehicle information and the map data because the host vehicle information includes the position of the host vehicle and the map data includes road data and the data that allows the circular intersection to be discerned. The driving assistance device disables the notification of the likelihood of the host vehicle intersecting with the other vehicle on the basis of the circular intersection that exists in the course of the host vehicle forward of the host vehicle. The driving assistance device can thus prevent a false notification at a circular intersection where the host vehicle is unlikely to intersect with the other vehicle. Since the host vehicle intersects with another vehicle in an intersection, the notification of the likelihood of the host vehicle intersecting with the other vehicle constitutes driving assistance that is related to the passage through an intersection. Thus, the driving assistance device described above provides driving assistance that is related to the passage through an intersection and can prevent a false notification.

According to a second aspect of the present disclosure, a driving assistance device for a vehicle includes: an assistance processing portion that executes a notification of a possibility of a host vehicle intersecting with an other vehicle based on host vehicle information and an other vehicle information, the host vehicle information being vehicle information including information that provides an estimation of a travelling course of the host vehicle, and the other vehicle information being vehicle information including information that provides an estimation of a travelling course of the other vehicle and being acquired by wireless communication; and a recognition result acquisition portion that acquires a recognition result performed by a recognition device, which recognizes a traffic sign indicating that a circular intersection is disposed in front of the host vehicle in the travelling course of the host vehicle, according to a sensing result performed by a perimeter monitoring sensor that monitors a predetermined range in front of the host vehicle. The assistance processing portion prevents the notification based on the recognition result, obtained by the recognition result acquisition portion, that the recognition device recognizes the traffic sign indicating that the circular intersection is disposed in front of the host vehicle in the travelling course of the host vehicle.

The driving assistance device described above can determine whether a circular intersection exists in the course of the host vehicle forward of the host vehicle using at least the host vehicle information and the map data because the host vehicle information includes the position of the host vehicle and the map data includes road data and the data that allows the circular intersection to be discerned. The driving assistance device disables the notification of the likelihood of the host vehicle intersecting with the other vehicle on the basis of the circular intersection that exists in the course of the host vehicle forward of the host vehicle. The driving assistance device can thus prevent a false notification at a circular intersection where the host vehicle is unlikely to intersect with the other vehicle. Since the host vehicle intersects with another vehicle in an intersection, the notification of the likelihood of the host vehicle intersecting with the other vehicle constitutes driving assistance that is related to the passage through an intersection. Thus, the driving assistance device described above provides driving assistance that is related to the passage through an intersection and can prevent a false notification.

BRIEF DESCRIPTION OF DRAWINGS

The above and other objects, features and advantages of the present disclosure will become more apparent from the following detailed description made with reference to the accompanying drawings. In the drawings.

EMBODIMENTS

Some embodiments and modifications provided for disclosure are described below with reference to the drawings. For convenience of description, components having identical functions with those illustrated in drawings used for description in foregoing embodiments and modifications may be designated with the identical symbols, and their description may be omitted. For components designated with identical symbols, description in other embodiments and/or modifications can be referenced.

First Embodiment

<Schematic Configuration of Driving Assistance System 1>

Figure 1:
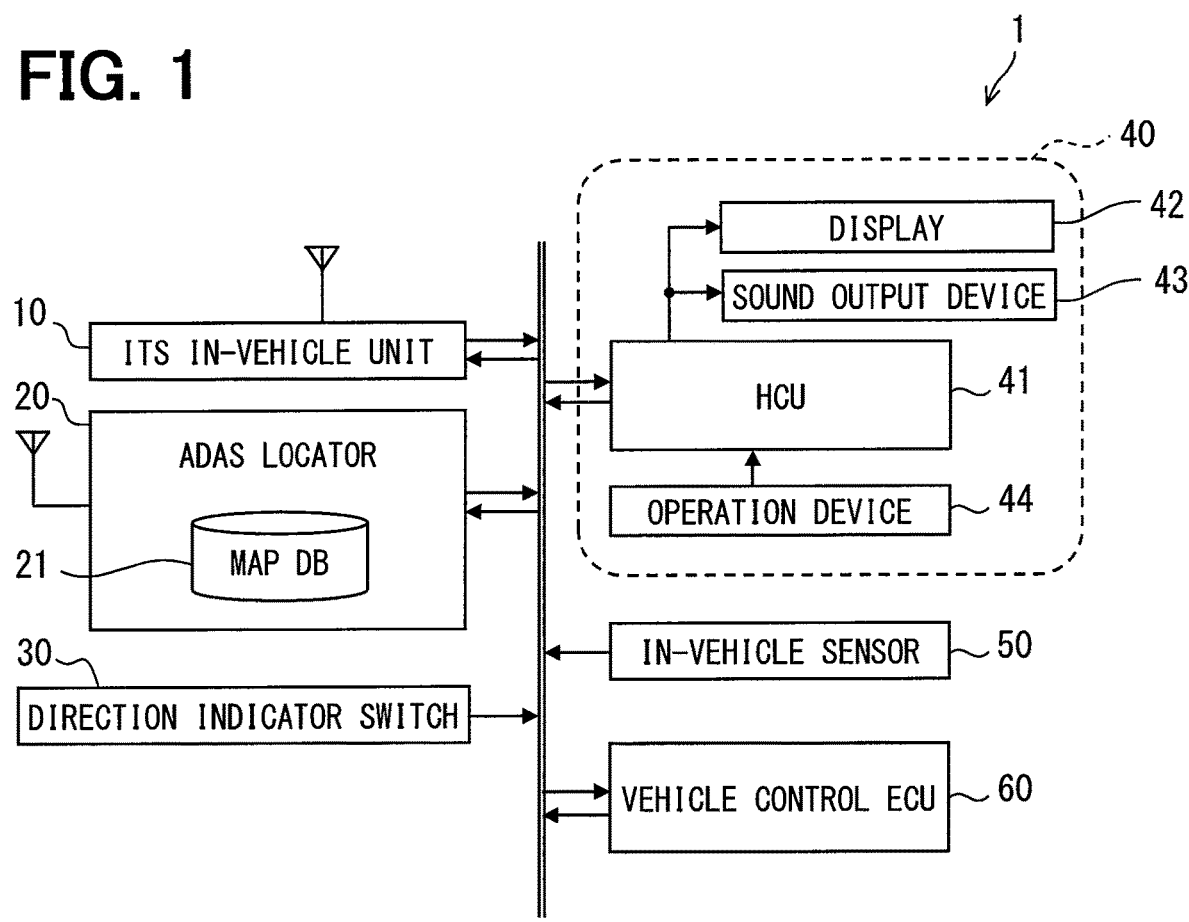
FIG. 1 is a diagram of an exemplary schematic configuration of a driving assistance system 1 according to a first embodiment.

A first embodiment of the present disclosure is described below with reference to the drawings. A driving assistance system 1 illustrated in FIG. 1 is for installation in a vehicle and includes an intelligent transport systems (ITS) in-vehicle unit 10, an advanced driver assistance systems (ADAS) locator 20, a direction indicator switch 30, a human machine interface (HMI) system 40, an in-vehicle sensor 50, and a vehicle control ECU 60. The ITS in-vehicle unit 10, the ADAS locator 20, the direction indicator switch 30, the HMI system 40, the in-vehicle sensor 50, and the vehicle control ECU 60 are connected to, for example, an in-vehicle LAN and can communicate and exchange information with each other. A vehicle in which the driving assistance system 1 is mounted is referred to as the host vehicle hereinafter.

The ADAS locator 20 includes a global navigation satellite system (GNSS) receiver, an inertial sensor, such as a 3D gyro sensor, and a map database (hereinafter referred to as DB) 21 that has map data stored therein. The GNSS receiver receives positioning signals from a plurality of artificial satellites. The 3D gyro sensor includes, for example, a three-axis gyro sensor and a three-axis acceleration sensor.

The ADAS locator 20 combines a positioning signal received by the GNSS receiver and a measurement result of the inertial sensor and sequentially determines the position of the host vehicle (hereinafter referred to as a host vehicle position). Alternatively, the ADAS locator 20 may determine the host vehicle position by using a measurement result of an in-vehicle sensor 50 to be described below in place of a measurement result of the inertial sensor. The host vehicle position may be expressed by coordinates of, for example, latitude and longitude. The coordinates may include altitude in addition to the latitude and longitude.

The ADAS locator 20 reads the map data from the map DB 21, such as link data in the course of the host vehicle forward of the host vehicle, node data, and road information including a road shape. The ADAS locator 20 sequentially outputs to the in-vehicle LAN the host vehicle position and the map data in the course of the host vehicle forward of the host vehicle.

The link data includes a unique number (link ID) that identifies a link, a link length indicative of the length of the link, a link direction, information on the shape of the link, node coordinates of a leading end and a trailing end of the link (latitude and longitude), data of road attributes, and other data. The road attributes include a road name, a road type, a road width, the number of lanes, and a speed limit. The node data includes a node ID that assigns a unique number to each node on the map, node coordinates, a node name, a node type, a connection link ID that describes the link ID of a link that is connected to a node, an intersection type, and other data.

The intersection type included in the map data can at least makes a distinction between a circular intersection and other types of intersection. The intersection type corresponds to data that allows the circular intersection to be discerned. A circular intersection connects three or more roads using a circular space that has a central island around which traffic travels in one direction. The circular intersection may be referred to as a roundabout.

The ADAS locator 20 may be eliminated as long as the driving assistance system 1 includes a device that detects the host vehicle position and the map DB 21. For example, an in-vehicle navigation system may be used.

The direction indicator switch 30 is a switch for detecting the operation on a direction indicator lever, which is a component to operate to activate direction indicator lamps of the host vehicle, to activate a right or left one of the direction indicator lamps. The direction indicator switch 30 outputs to the in-vehicle LAN a direction indicator signal for turning right or left in accordance with the operation on the direction indicator lever.

The HMI system 40 includes a human machine interface control unit (HCU) 41, a display 42, a sound output device 43, and an operation device 44. The HMI system 40 receives input operation from a driver of the host vehicle and presents information to the driver of the host vehicle.

The display 42 may be, for example, a combination meter, a center information display (CID), and a head-up display (HUD). The combination meter is placed forward of a driver seat. The CID is placed upward of a center cluster in a cabin. The combination meter presents different images for notification in a display screen of a liquid crystal display on the basis of image data acquired from the HCU 41.

The HUD projects light of image based on the image data acquired from the HCU 41 onto a predefined projection area on a windshield. The driver in the driver seat perceives the light of image that is reflected by the windshield into the cabin. The driver can thus see the virtual image of the image projected by the HUD as overlaid with the external view forward of the host vehicle.

The sound output device 43 may be, for example, an audio speaker. An audio speaker is placed inside a door lining of the host vehicle. The audio speaker reproduces a sound to provide a notification to an occupant.

The operation device 44 represents switches to be operated by the driver of the host vehicle. The operation device 44 may include, for example, a steering switch provided on a spoke of a steering wheel of the host vehicle.

The HCU 41, which includes a CPU, a volatile memory, a nonvolatile memory, an I/O, and a bus that connects these components, executes a variety of operations by performing control programs stored in the nonvolatile memory. The functions executed by the HCU 41 may be in whole or in part configured in the form of hardware using one or more ICs or the like.

The in-vehicle sensors 50 represent different sensors mounted in the host vehicle. The in-vehicle sensors 50 may include a vehicle speed sensor, an acceleration sensor, a gyro sensor, and a geomagnetic sensor.

The vehicle control ECU 60 represents an electronic control unit that performs acceleration/deceleration control and/or steering control of the host vehicle. The vehicle control ECU 60 may include a steering ECU that performs the steering control, a power unit control ECU that performs the acceleration/deceleration control, and a brake ECU. The vehicle control ECU 60 acquires detection signals from sensors mounted in the host vehicle, such as an accelerator position sensor, a brake pedal effort sensor, a steering angle sensor, and a vehicle speed sensor and outputs control signals to traveling control devices, such as an electronically controlled throttle, a brake actuator, and an electric power steering (EPS) motor. The vehicle control ECU 60 can output the detection signals from the sensors described above to the in-vehicle LAN.

The ITS in-vehicle unit 10 communicates wirelessly with an in-vehicle communication unit mounted in a vehicle near the host vehicle and/or with a roadside unit provided on a roadside. For example, the ITS in-vehicle unit 10 performs vehicle-to-vehicle communication with the in-vehicle communication unit to acquire vehicle information, such as the position, speed, and traveling direction of the vehicle near the host vehicle. The ITS in-vehicle unit 10 then provides assistance to the driver in driving the vehicle on the basis of the vehicle information of the other vehicle acquired using the vehicle-to-vehicle communication and the vehicle information of the host vehicle. For example, the ITS in-vehicle unit 10 determines whether the host vehicle is likely to intersect with and come into collision with (hereinafter referred to simply to intersect with) another vehicle and, based on the affirmative determination, provides a notification that the host vehicle is likely to intersect with the other vehicle. That is, the ITS in-vehicle unit 10 provides driving assistance that is related to the passage through an intersection. The ITS in-vehicle unit 10 corresponds to the driving assistance device. The vehicle-to-vehicle communication may be configured to use, for example, a radio wave of a 700 MHz band, a radio wave of a 5.9 GHz band, or the like.

<Schematic Configuration of ITS In-Vehicle Unit 10>

Figure 2:
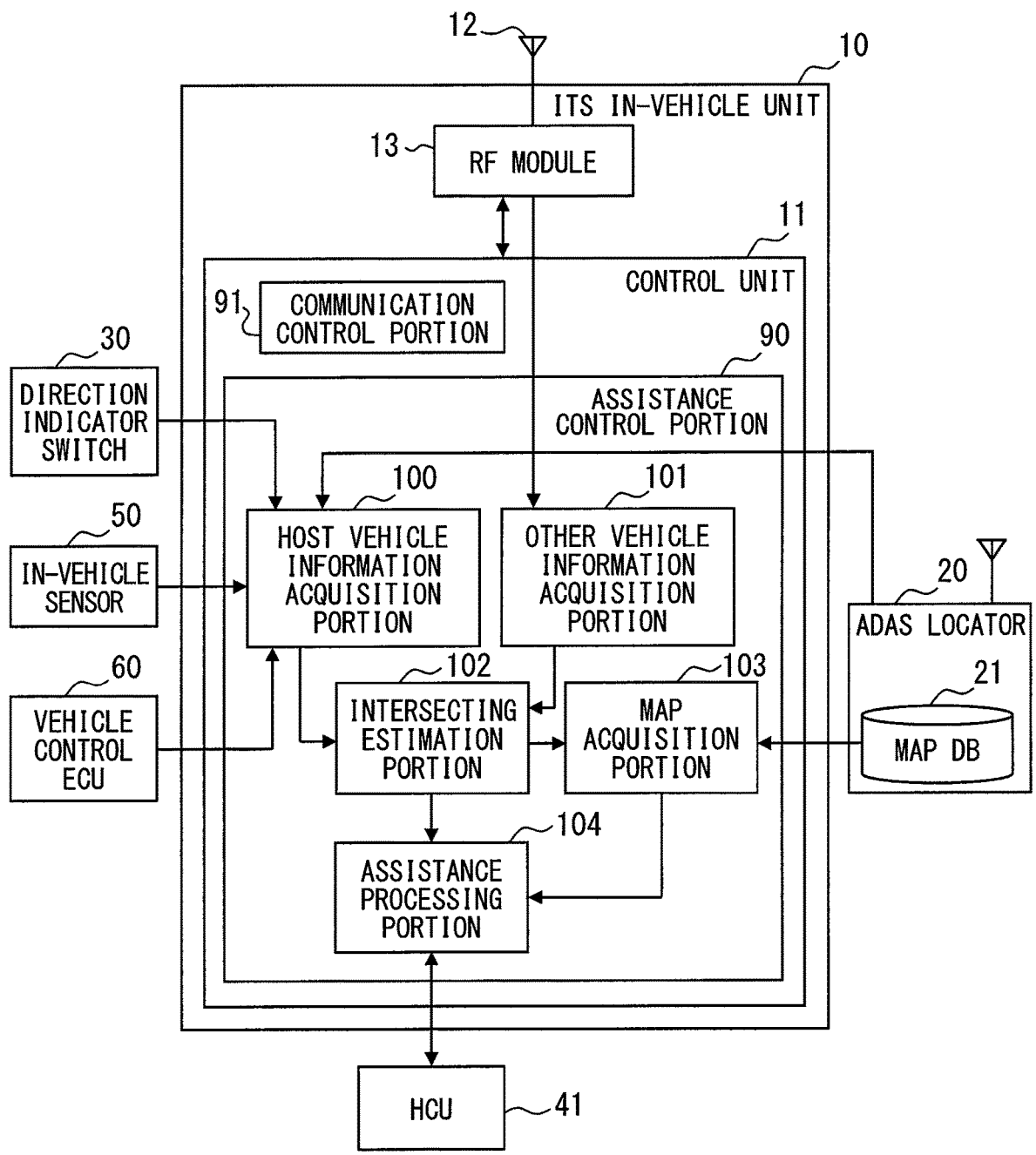
FIG. 2 is a diagram of an exemplary schematic configuration of an ITS in-vehicle unit 10 according to the first embodiment.

A schematic configuration of the ITS in-vehicle unit 10 is described below with reference to FIG. 2. As illustrated in FIG. 2, the ITS in-vehicle unit 10 includes a control unit 11, an RF antenna 12, and a radio frequency (RF) module 13. The RF module 13 is connected to the RF antenna 12. The control unit 11 is also connected to the RF module 13 in a manner that enables communication.

The RF antenna 12 is configured to transmit and receive a radio wave in a frequency band used for the vehicle-to-vehicle communication. The RF module 13 demodulates a signal received from the RF antenna 12. Specifically, the RF module 13 converts a received signal to a digital signal, and subjects the digitized data to various processing such as synchronous detection, propagation path estimation, and equalization, and, then, to error correction decoding. The demodulated data is then output to the control unit 11. The RF module 13 also subjects data that is received from the control unit 11 to error correction encoding, modulating, digital-to-analog conversion, and the like and coverts a resultant signal to a high frequency signal before causing the RF antenna 12 to transmit the signal wirelessly.

The control unit 11 controls the entire operation of the ITS in-vehicle unit 10. The control unit 11 is configured as an ordinary computer and includes a widely known CPU, a volatile memory, a nonvolatile memory, an input/output interface (hereinafter referred to as I/O), and a bus line that connects these components to each other.

The CPU, which is a widely known central processing unit, performs various operations using a memory as an operation area. The volatile memory is implemented using, for example, a temporary storage medium, such as a RAM; the nonvolatile memory is implemented using a nonvolatile storage medium, such as a ROM and a flash memory. The nonvolatile memory has stored therein a program module and data for the CPU to execute various processing and a device ID for identification of the ITS in-vehicle unit 10.

As illustrated in FIG. 2, the control unit 11 includes an assistance control portion 90 and a communication control portion 91 as functional blocks that are achieved by executing programs stored in the nonvolatile memory. The assistance control portion 90 is a functional block that executes processing for providing assistance to a driver in driving operation using the vehicle information of the host vehicle and the vehicle information of another vehicle received using the vehicle-to-vehicle communication. The communication control portion 91 is a functional block mainly for executing the vehicle-to-vehicle communication. The assistance control portion 90 and the communication control portion 91 may be achieved by a single CPU or different CPUs.

The functions of the control unit 11 may be in whole or in part configured in the form of hardware using one or more ICs or the like.

<Schematic Configuration of Assistance Control Portion 90>

A schematic configuration of the assistance control portion 90 is described below with reference to FIG. 2. As illustrated in FIG. 2, the assistance control portion 90 includes a host vehicle information acquisition portion 100, an other vehicle information acquisition portion 101, an intersecting estimation portion 102, a map acquisition portion 103, and an assistance processing portion 104 as functional blocks.

The host vehicle information acquisition portion 100 acquires the vehicle information of the host vehicle from the ADAS locator 20, the direction indicator switch 30, the in-vehicle sensors 50, the vehicle control ECU 60, and the like. The vehicle information of the host vehicle includes information that enables estimation of the course of the host vehicle, which may be, for example, the host vehicle position, the traveling direction of the host vehicle, the speed of the host vehicle, and the direction indicator signal. The vehicle information of the host vehicle corresponds to host vehicle information.

The host vehicle position may be the latest host vehicle position that is determined by the ADAS locator 20 and acquired from the ADAS locator 20. The traveling direction of the host vehicle may be the latest bearing of the host vehicle that is detected by the geomagnetic sensor, which is one of the in-vehicle sensors 50. The speed of the host vehicle may be acquired based on a detection signal of the vehicle speed sensor, which is one of the in-vehicle sensors 50, or a detection signal of the vehicle speed sensor output by the vehicle control ECU 60. The direction indicator signal may be acquired from the direction indicator switch 30.

The traveling direction of the host vehicle may be determined from time-series data of the host vehicle position sequentially acquired by the host vehicle information acquisition portion 100. For example, a bearing resulting from an approximate line obtained using a method of least squares from a plurality of host vehicle positions lined up on a time-series basis may be determined as the traveling direction of the host vehicle. The speed of the host vehicle may be determined by the host vehicle information acquisition portion 100 from a quantity of change of the host vehicle position per unit time.

The other vehicle information acquisition portion 101 sequentially acquires, via the RF antenna 12 and the RF module 13, the vehicle information of another vehicle transmitted sequentially from a wireless communication unit that is mounted in the other vehicle. The vehicle information of another vehicle includes information that enables estimation of the course of the other vehicle, which may be, for example, the position of the other vehicle (hereinafter referred to as the other vehicle position), the traveling direction of the other vehicle, and the speed of the other vehicle. The vehicle information of another vehicle corresponds to another vehicle information. The wireless communication unit mounted in another vehicle may be an ITS in-vehicle unit 10 or any other wireless communication unit.

The other vehicle position transmitted from the other vehicle may be time-series data of the other vehicle position. In this case, the traveling direction of the other vehicle may be determined by the other vehicle information acquisition portion 101 from the time-series data of the other vehicle position. For example, a bearing resulting from an approximate line obtained using the method of least squares from a plurality of other vehicle positions lined up on a time-series basis may be determined as the traveling direction of the other vehicle. The speed of the other vehicle may be determined by the host vehicle information acquisition portion 100 from a quantity of change of the other vehicle position per unit time.

The intersecting estimation portion 102 estimates an intersecting position in which the host vehicle is likely to intersect with another vehicle on the basis of the vehicle information of the host vehicle acquired by the host vehicle information acquisition portion 100 and the vehicle information of the other vehicle acquired by the other vehicle information acquisition portion 101. If an intersecting position is estimated, it is determined that the host vehicle is likely to intersect with the other vehicle. If no intersecting position is estimated, that is, if it is estimated that the host vehicle is not likely to intersect with the other vehicle, it is determined that the host vehicle is unlikely to intersect with the other vehicle.

The intersecting position in which the host vehicle is likely to intersect with the other vehicle may be estimated by, for example, calculating a position in which the course of the host vehicle estimated from the vehicle information of the host vehicle intersects with the course of the other vehicle estimated from the vehicle information of the other vehicle.

To obtain the course of the host vehicle, a traveling path is calculated on the basis of an assumption that the host vehicle moves straight from the acquired host vehicle position in the acquired traveling direction of the host vehicle at the acquired speed of the host vehicle if the direction indicator signal acquired by the host vehicle information acquisition portion 100 is not a signal for turning right or left. The calculated traveling path is then provided as an estimated course of the host vehicle. If the direction indicator signal is a signal for turning right or left, it is assumed that the host vehicle will turn to the direction indicated by the direction indicator signal in a predefined turning radius, and a traveling path is calculated on the basis of an assumption that the host vehicle turns at the predefined turning radius from the acquired host vehicle position in the acquired traveling direction at the acquired speed. The calculated traveling path is then provided as an estimated course of the host vehicle. The predefined turning radius may be defined taking into consideration a typical vehicle turning radius for turning right or left at, for example, a crossroads where roads intersect with each other at right angles.

To obtain the course of the other vehicle, a traveling path is calculated on the basis of an assumption that the other vehicle moves straight from the other vehicle position acquired by the other vehicle information acquisition portion 101 in the acquired traveling direction of the other vehicle at the acquired speed of the other vehicle. The calculated traveling path is then provided as an estimated course of the other vehicle. Alternatively, when the other vehicle information acquisition portion 101 acquires the time-series data of the other vehicle position, a traveling path may be calculated on the basis of an assumption that the other vehicle travels in the turning radius identical with that indicated by the time-series data of the other vehicle and at the acquired speed of the other vehicle. Alternatively, when the other vehicle information acquisition portion 101 acquires the steering angle of the other vehicle, a traveling path may be calculated on the basis of an assumption that the other vehicle travels with a steering angle fixed at the acquired steering angle of the other vehicle and at the acquired speed of the other vehicle.

An intersecting position in which the host vehicle is likely to intersect with another vehicle may be estimated as coordinates of a position in which the estimated course of the host vehicle intersects with the estimated course of the other vehicle on a coordinate plane of the latitude and the longitude. The method described herein of determining whether the host vehicle is likely to intersect with another vehicle based on the vehicle information of the host vehicle and the vehicle information of the other vehicle is merely an example; the likelihood may be determined in any other method.

If it is determined that the host vehicle is likely to intersect with the other vehicle, the intersecting estimation portion 102 calculates a remaining time before the host vehicle intersects with the other vehicle (hereinafter referred to as time to collision or TTC). The TTC may be obtained by dividing the distance from the position of the host vehicle to the intersecting position by the relative speed of the host vehicle to the other vehicle.

The map acquisition portion 103 acquires map data, such as road information in the course of the host vehicle forward of the host vehicle, from the map DB 21 of the ADAS locator 20.

The assistance processing portion 104 outputs to the HCU 41 an instruction to provide a notification that the host vehicle is likely to intersect with another vehicle on the basis of the determination made by the intersecting estimation portion 102 that the host vehicle is likely to intersect with the other vehicle. The assistance processing portion 104 disables the notification that the host vehicle is likely to intersect with another vehicle if a circular intersection exists in the course of the host vehicle forward of the host vehicle at a distance less than a threshold value from the intersecting position estimated by the intersecting estimation portion 102. This will be described below in detail.

Upon receiving the instruction to provide the notification, the HCU 41 causes the display 42 and/or the sound output device 43 to provide the notification that the host vehicle is likely to intersect with the other vehicle. An example of the notification provided by the display 42 includes presentation of a text and an icon image. An example of the notification provided by the sound output device 43 includes reading of a text and output of a warning sound.

<Intersection Assistance Related Processing in the First Embodiment>

Figure 3:
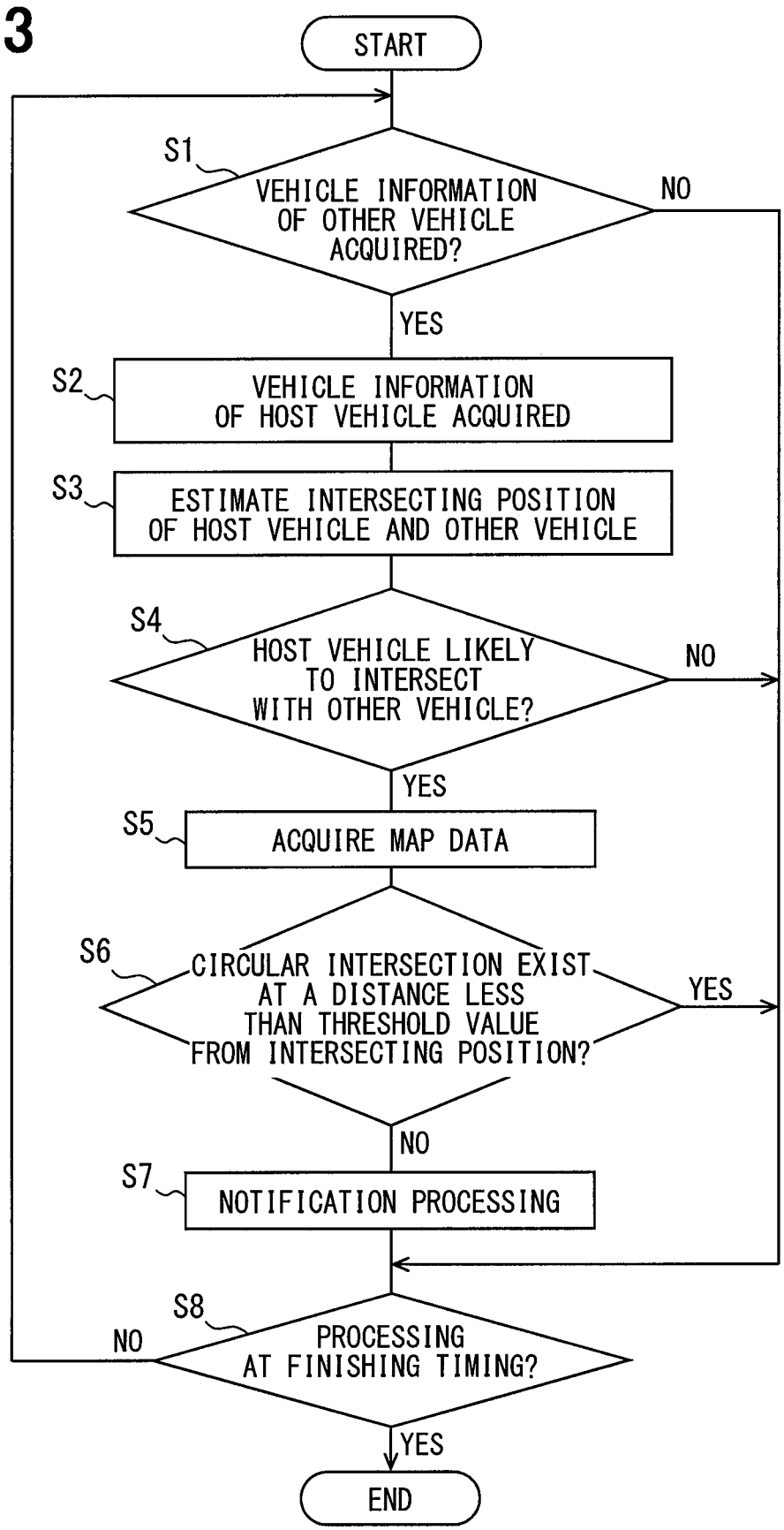
FIG. 3 is a flowchart illustrating an exemplary flow of intersection assistance related processing performed by an assistance control portion 90 according to the first embodiment.

An exemplary flow of processing of driving assistance that is related to the passage through an intersection (hereinafter referred to as the intersection assistance related processing), which is performed by the assistance control portion 90, is described below with reference to a flowchart in FIG. 3. The flowchart in FIG. 3 may start when, for example, the ignition of the host vehicle is turned on to activate the ITS in-vehicle unit 10.

In step S1, if the other vehicle information acquisition portion 101 acquires the vehicle information of another vehicle (yes in S1), the flowchart proceeds to step S2. If no vehicle information of another vehicle is acquired (no in S1), the flowchart proceeds to step S8.

In step S2, the host vehicle information acquisition portion 100 acquires the vehicle information of the host vehicle. In step S3, the intersecting estimation portion 102 estimates an intersecting position in which the host vehicle is likely to intersect with the other vehicle. In step S4, if the intersecting estimation portion 102 estimates an intersecting position and thereby determines that the host vehicle is likely to intersect with the other vehicle (yes in S4), the flowchart proceeds to step S5. If the intersecting estimation portion 102 estimates no intersecting position and thereby determines that the host vehicle is unlikely to intersect with the other vehicle (no in S4), the flowchart proceeds to step S8.

In step S5, the map acquisition portion 103 acquires map data, such as road information in the course of the host vehicle forward of the host vehicle, from the map DB 21 of the ADAS locator 20. Whether the road information is of the course of the host vehicle forward of the host vehicle may be determined from, for example, the host vehicle position and the traveling direction of the host vehicle acquired by the host vehicle information acquisition portion 100.

In step S6, the assistance processing portion 104 determines whether a circular intersection exists in the course of the host vehicle forward of the host vehicle at a distance less than a threshold value from the intersecting position estimated by the intersecting estimation portion 102 on the basis of the intersecting position and the map data acquired by the map acquisition portion 103 (which is the road information in the course of the host vehicle forward of the host vehicle). For example, the assistance processing portion 104 calculates the distance in a straight line from the position of an intersection whose intersection type is a circular intersection to the intersecting position. If the calculated distance in the straight line is less than the threshold value, the assistance processing portion 104 determines that a circular intersection exists in the course of the host vehicle forward of the host vehicle.

If it is determined that a circular intersection exists in the course of the host vehicle forward of the host vehicle at a distance less than the threshold value from the intersecting position (yes in S6), the flowchart proceeds to step S8. Otherwise (no in S6), the flowchart proceeds to step S7.

The threshold value used in S6 is a distance that may be near a circular intersection, which includes a distance inside the circular intersection, and may be defined to any value taking into consideration the estimation accuracy of the intersecting position. For example, the threshold value may be several meters to several tens of meters. The processing in S6 determines whether there is a high likelihood of both the host vehicle and the other vehicle entering the circular intersection.

In step S7, the assistance processing portion 104 performs notification processing in which a notification is provided in accordance with a mode of the host vehicle intersecting with the other vehicle estimated by the intersecting estimation portion 102. In an example provided in the first embodiment, the notification processing is performed to provide a notification of the host vehicle, which is to turn to a direction that crosses the opposite lane, intersecting with another vehicle or a notification of the host vehicle, which is to move straight, intersecting with another vehicle. Turning to a direction that crosses the opposite lane means that a vehicle turns right in a region that requires vehicles to be driven on the left-hand side of the road and that a vehicle turns left in a region that requires vehicles to be driven on the right-hand side of the road.

For example, if the intersecting estimation portion 102 estimates that the host vehicle, which is to turn to a direction that crosses the opposite lane, is likely to intersect with another vehicle, a notification is provided to call attention to the other vehicle, which is to move straight in the opposite lane. In another example, if the intersecting estimation portion 102 estimates that the host vehicle, which is to move straight, is likely to intersect with another vehicle, a notification is provided to call attention to the other vehicle, which is to enter the intersection via a road that intersects with the road in which the host vehicle is traveling. Some notification modes are described above just to provide examples; the notification may be provided in any other modes.

If it is determined in S6 that a circular intersection exists in the course of the host vehicle forward of the host vehicle at a distance less than a threshold value from the intersecting position, the assistance processing portion 104 disables the notification processing in S7.

That the notification processing is disabled in S7 means that the notification of the host vehicle, which is to turn to a direction that crosses the opposite lane, intersecting with another vehicle and the notification of the host vehicle, which is to move straight, intersecting with another vehicle are disabled; any other types of notification should be provided. For example, some types of notification that are needed in a circular intersection, such as a notification provided by a blind spot monitor (BSM) function to notify of another vehicle rearward or sideward of the host vehicle using an autonomous sensor mounted in the host vehicle, should be provided in the notification processing.

In step S8, if the intersection assistance related processing is at a finishing timing (yes in S8), the intersection assistance related processing is finished. If the intersection assistance related processing is not at the finishing timing (no in S8), the flowchart reverts back to S1 to repeat the processing. An example of the finishing timing of the intersection assistance related processing may be when the ignition of the host vehicle is turned off.

Conclusion of the First Embodiment

In the first embodiment, the notification of the likelihood of the host vehicle intersecting with another vehicle is disabled on the basis of the determination made by the assistance processing portion 104 that a circular intersection exists in the course of the host vehicle forward of the host vehicle at a distance less than a threshold value from an intersecting position, estimated by the intersecting estimation portion 102, in which the host vehicle is likely to intersect with the other vehicle. Thus, this configuration can prevent a false notification at a circular intersection where the host vehicle is unlikely to intersect with the other vehicle.

In the first embodiment, the notification of the likelihood of the host vehicle intersecting with another vehicle is disabled under a limited condition; it is limited to when a circular intersection exists in the course of the host vehicle forward of the host vehicle at a distance less than a threshold value from an intersecting position in which the host vehicle is likely to intersect with the other vehicle. Thus, this configuration can accurately prevent an unnecessary notification in an area near a circular intersection.

An operational advantage of the present disclosure is described below in detail with reference to FIGS. 4 to 7. Examples illustrated in FIGS. 4 to 7 correspond to a region that requires vehicles to be driven on the left-hand side of the road; the sides are reversed in a region that requires vehicles to be driven on the right-hand side of the road.

Figure 4:
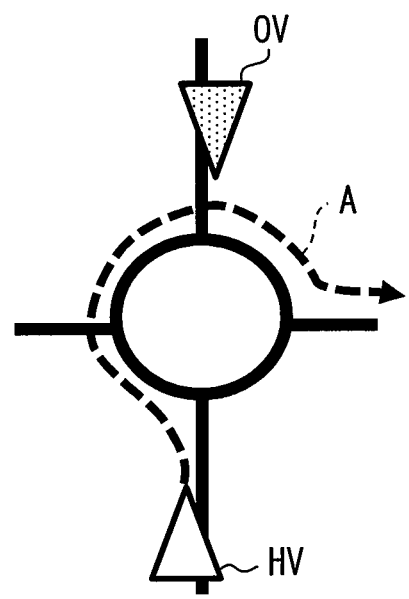
FIG. 4 is a diagram of an exemplary traveling route of the host vehicle at a circular intersection.
Figure 5:
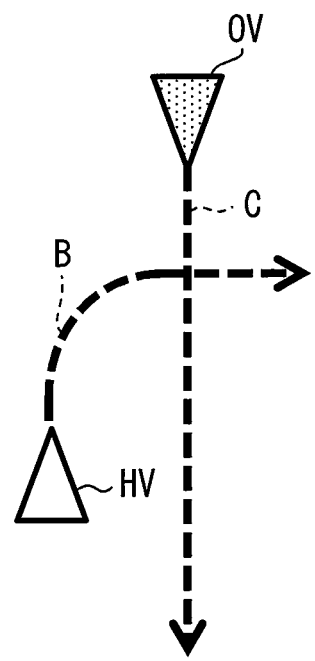
FIG. 5 is a diagram of an exemplary course of the host vehicle estimated from the vehicle information of the host vehicle and an exemplary course of another vehicle estimated from the vehicle information of the other vehicle acquired using vehicle-to-vehicle communication.

An example is described with reference to FIGS. 4 and 5 below, in which the host vehicle enters a circular intersection via an entering road and exits the intersection via an exit road that is located to the right of the entering road. FIG. 4 is a diagram of a traveling route of the host vehicle (see A in FIG. 4) in the circular intersection; FIG. 5 illustrates the course of the host vehicle (see B in FIG. 5) estimated from the vehicle information of the host vehicle and the course of another vehicle (see C in FIG. 5) estimated from the vehicle information of the other vehicle acquired using the vehicle-to-vehicle communication. In FIGS. 4 and 5, HV represents the host vehicle, and OV represents the other vehicle.

Many drivers activate the direction indicator lamps to indicate a direction in which the exit road from the circular intersection is located, instead of a direction to turn to when entering the circular intersection. As illustrated in FIG. 5, many drivers who intend to exit the circular intersection via the exit road located to the right of the entering road activate the right direction indicator lamp when entering the circular intersection. In this case, the intersecting estimation portion 102 may estimate that a course of the host vehicle, which is to turn right, is likely to intersect with a course of another vehicle, which is to move straight, as illustrated in FIG. 5 from the vehicle information of the host vehicle and the vehicle information of the other vehicle acquired using the vehicle-to-vehicle communication and determine that the host vehicle is likely to intersect with the other vehicle.

The host vehicle is, however, unlikely to intersect with the other vehicle in the circular intersection from the standpoint of the structure of the intersection where the traffic flows in one direction in the circular portion of the intersection. Although the intersecting estimation portion 102 may determine that the host vehicle, which is to turn right, is likely to intersect with the other vehicle, no notification of it is needed. Since a notification of the host vehicle, which is to turn right, intersecting with the other vehicle in the circular intersection is disabled in the first embodiment, a false notification can be prevented.

Figure 6:
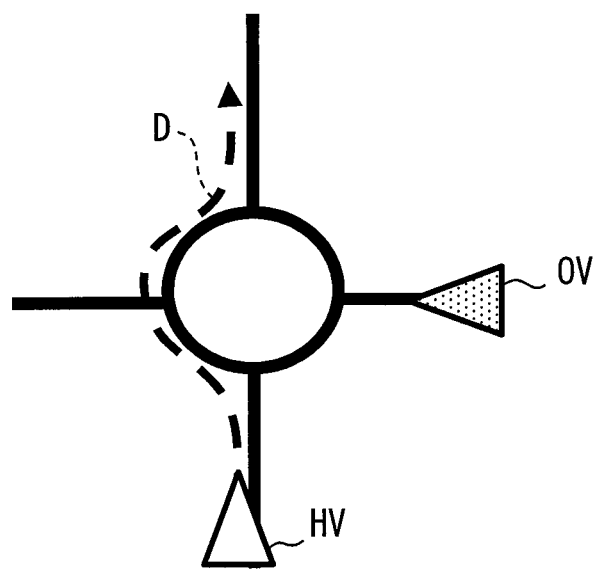
FIG. 6 is a diagram of an exemplary traveling route of the host vehicle at a circular intersection.
Figure 7:
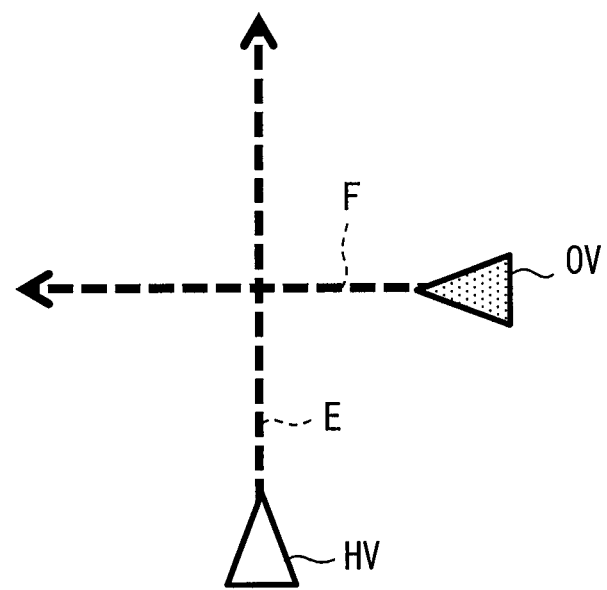
FIG. 7 is a diagram of an exemplary course of the host vehicle estimated from the vehicle information of the host vehicle and an exemplary course of another vehicle estimated from the vehicle information of the other vehicle acquired using the vehicle-to-vehicle communication.

An example is described with reference to FIGS. 6 and 7 below, in which the host vehicle enters a circular intersection via an entering road and exits the intersection via an exit road that is located forward of the entering road. FIG. 6 is a diagram of a traveling route of the host vehicle (see D in FIG. 4) in the circular intersection; FIG. 5 illustrates the path of the host vehicle (see E in FIG. 5) estimated from the vehicle information of the host vehicle and the course of another vehicle (see F in FIG. 5) estimated from the vehicle information of the other vehicle acquired using the vehicle-to-vehicle communication. In FIGS. 6 and 7, HV represents the host vehicle, and OV represents the other vehicle.

As illustrated in FIG. 6, many drivers who intend to exit the circular intersection via the exit road located forward of the entering road do not activate the direction indicator lamps when entering the circular intersection. In this case, the intersecting estimation portion 102 may estimate that a course of the host vehicle, which is to move straight, is likely to intersect with a course of the other vehicle, which is to move straight, as illustrated in FIG. 7 from the vehicle information of the host vehicle and the vehicle information of the other vehicle acquired using the vehicle-to-vehicle communication. The intersecting estimation portion 102 may thus determine that the host vehicle is likely to intersect with the other vehicle.

The host vehicle is, however, unlikely to intersect with the other vehicle in the circular intersection from the standpoint of the structure of the intersection where the traffic flows in one direction in the circular portion of the intersection. Although the intersecting estimation portion 102 may determine that the host vehicle, which is to move straight, is likely to intersect with the other vehicle, no notification of it is needed. Since a notification of the host vehicle, which is to move straight, intersecting with the other vehicle in the circular intersection is disabled in the first embodiment, a false notification can be prevented.

First Modification

While the notification processing is disabled if a circular intersection exists in the course of the host vehicle forward of the host vehicle at a distance less than a threshold value from an intersecting position estimated by the intersecting estimation portion 102 in the first embodiment, this is not a limitation. For example, the notification processing may be disabled if a circular intersection exists in the course of the host vehicle forward of the host vehicle in a path between the position of the host vehicle and the position of another vehicle (a first modification).

The first modification of the present disclosure is described below with reference to the drawings. The driving assistance system 1 according to the first modification is similar to the driving assistance system according to the first embodiment except that the assistance processing portion 104 of the ITS in-vehicle unit 10 performs different processing.

Figure 8:
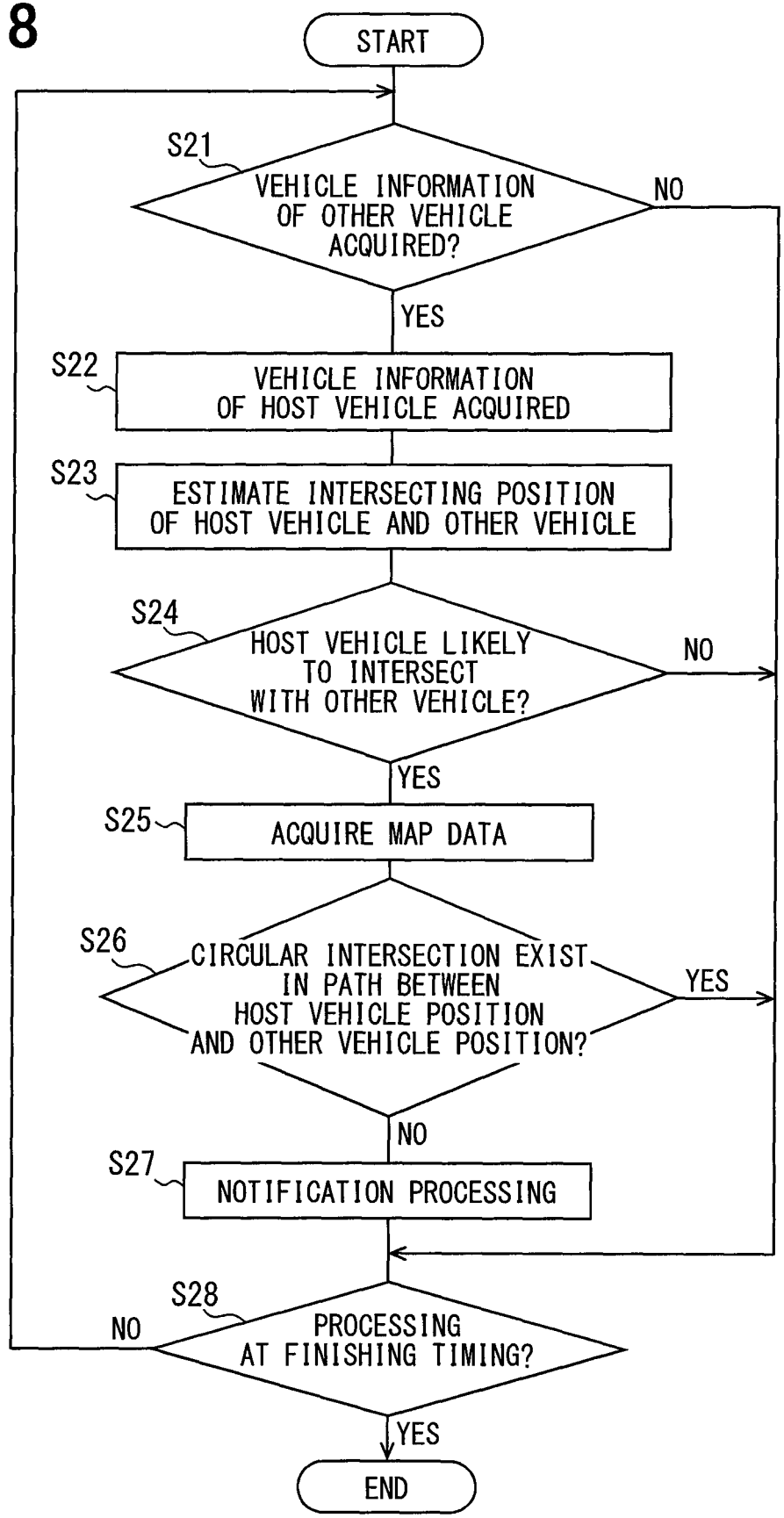
FIG. 8 is a flowchart illustrating an exemplary flow of intersection assistance related processing performed by the assistance control portion 90 according to a first modification.

An exemplary flow of intersection assistance related processing, which is performed by the assistance control portion 90, according to the first modification is described below with reference to FIG. 8. The flowchart in FIG. 8 may start when the ignition of the host vehicle is turned on to activate the ITS in-vehicle unit 10 as in the case with the flowchart in FIG. 3.

Parts of the processing from step S21 to S25 and from step S27 to S28 are similar to those from S1 to S5 and from S7 to S8 described above.

In step S26, the assistance processing portion 104 determines whether a circular intersection exists in the course of the host vehicle forward of the host vehicle in a path between the host vehicle position and the other vehicle position on the basis of the host vehicle position from the vehicle information of the host vehicle acquired by the host vehicle information acquisition portion 100, the other vehicle position from the vehicle information of the other vehicle acquired by the other vehicle information acquisition portion 101, and map data acquired by the map acquisition portion 103 (which is the road information in the course of the host vehicle forward of the host vehicle).

Widely known map matching, for example, may be performed in which the host vehicle position and the other vehicle position are matched with road links on the map data. If this processing finds a node whose intersection type is a circular intersection in a path between a road link in which the host vehicle is located and a road link in which the other vehicle is located, the assistance processing portion 104 may determine that a circular intersection exists in the course of the host vehicle forward of the host vehicle.

If it is determined that a circular intersection exists in the course of the host vehicle forward of the host vehicle (yes in S26), the flowchart proceeds to step S28. Otherwise (no in S26), the flowchart proceeds to step S27.

To prevent a necessary notification of the likelihood of the host vehicle intersecting with another vehicle from being disabled, a further condition is preferably added that the path between the road link in which the host vehicle is located and the node of the circular intersection does not include any other nodes.

A method other than the map matching may be used to determine the traveling routes of the other vehicle and the host vehicle. Then, if an intersection whose intersection type is a circular intersection is found in a path between the traveling routes of the host vehicle and the other vehicle, the assistance processing portion 104 may determine that a circular intersection exists in the course of the host vehicle forward of the host vehicle.

In the first modification, the notification of the likelihood of the host vehicle intersecting with another vehicle is disabled on the basis of the determination made by the assistance processing portion 104 that a circular intersection exists in the course of the host vehicle forward of the host vehicle, as in the case with the first embodiment. Thus, this configuration can prevent a false notification at a circular intersection where the host vehicle is unlikely to intersect with the other vehicle.

In the first modification, the notification of the likelihood of the host vehicle intersecting with another vehicle is disabled under a limited condition; it is limited to when a circular intersection exists in the course of the host vehicle forward of the host vehicle in a path between the host vehicle position and the other vehicle position. Thus, this configuration can accurately prevent an unnecessary notification when there is a high likelihood of the host vehicle and another vehicle entering a circular intersection or having entered the circular intersection.

Second Modification

The notification processing may be disabled using a configuration other than those in the first embodiment and the second modification on the basis of, for example, a circular intersection that exists in the course of the host vehicle forward of the host vehicle (a second modification). The second modification of the present disclosure is described below with reference to the drawings. The driving assistance system 1 according to the second modification is similar to the driving assistance system according to the first embodiment except that the assistance processing portion 104 of the ITS in-vehicle unit 10 performs different processing.

Figure 9:
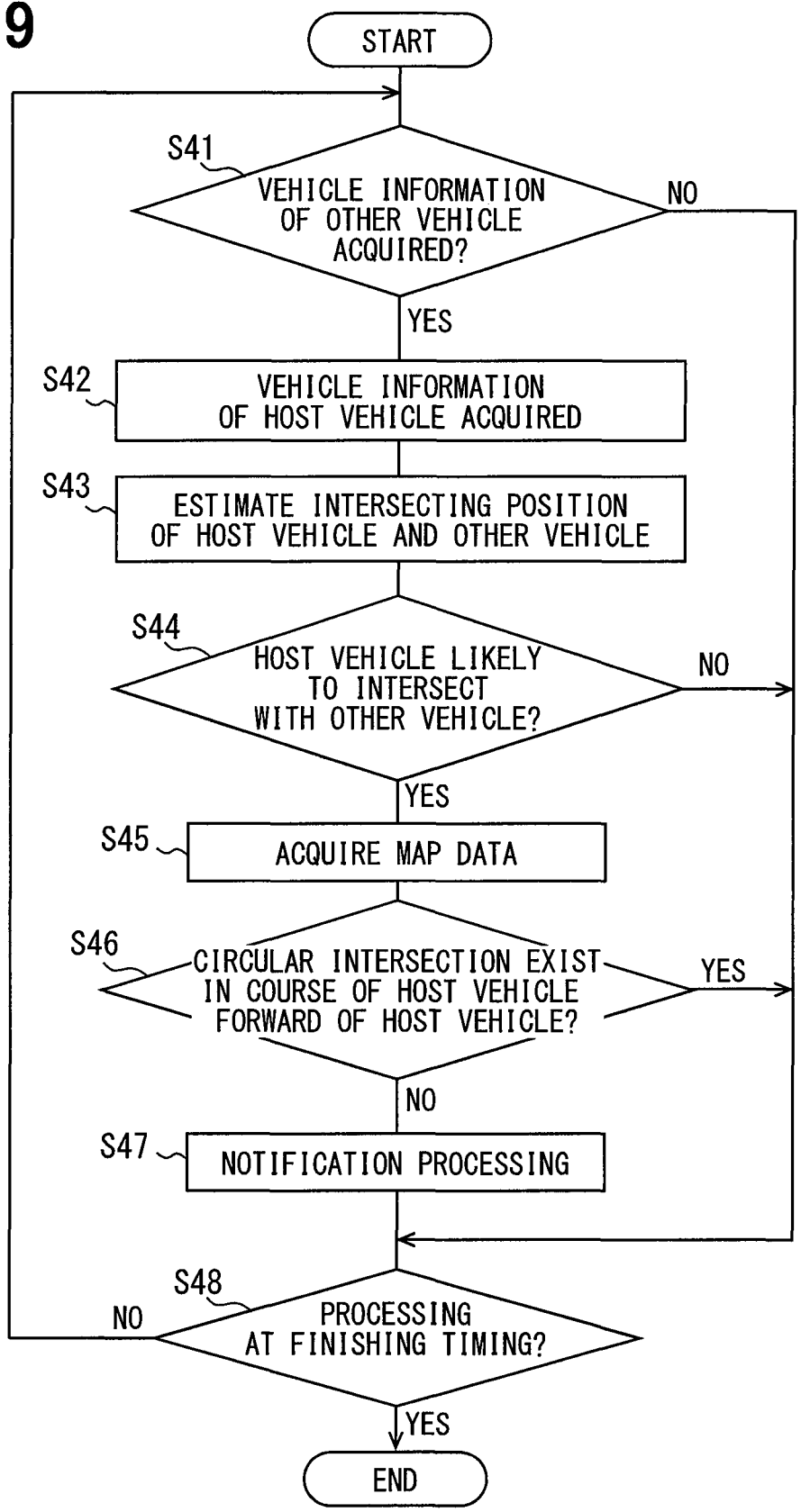
FIG. 9 is a flowchart illustrating an exemplary flow of intersection assistance related processing performed by the assistance control portion 90 according to a second modification.

An exemplary flow of intersection assistance related processing, which is performed by the assistance control portion 90, according to the second modification is described below with reference to FIG. 9. The flowchart in FIG. 9 may start when the ignition of the host vehicle is turned on to activate the ITS in-vehicle unit 10 as in the case with the flowchart in FIG. 3.

Parts of the processing from step S41 to S45 and from step S47 to S48 are similar to those from S1 to S5 and from S7 to S8 described above.

In step S46, the assistance processing portion 104 determines whether a circular intersection exists in the course of the host vehicle forward of the host vehicle on the basis of the host vehicle position from the vehicle information of the host vehicle acquired by the host vehicle information acquisition portion 100 and the map data acquired by the map acquisition portion 103 (which is the road information in the course of the host vehicle forward of the host vehicle).

Widely known map matching, for example, may be performed in which the host vehicle position is matched with a road link on the map data. If this processing finds a node whose intersection type is a circular intersection in the course of the host vehicle forward of the road link in which the host vehicle is located, the assistance processing portion 104 may determine that a circular intersection exists in the course of the host vehicle forward of the host vehicle.

If it is determined that a circular intersection exists in the course of the host vehicle forward of the host vehicle (yes in S46), the flowchart proceeds to step S48. Otherwise (no in S46), the flowchart proceeds to step S47.

To prevent a necessary notification of the likelihood of the host vehicle intersecting with another vehicle from being disabled, a further condition is preferably added that the path between the road link in which the host vehicle is located and the node of the circular intersection does not include any other nodes.

In the second modification, the notification of the likelihood of the host vehicle intersecting with another vehicle is disabled on the basis of the determination made by the assistance processing portion 104 that a circular intersection exists in the course of the host vehicle forward of the host vehicle, as in the case with the first embodiment. Thus, this configuration can prevent a false notification at a circular intersection where the host vehicle is unlikely to intersect with the other vehicle.

Second Embodiment

While the map acquisition portion 103 acquires the map data from the map DB 21 provided in the host vehicle in the first embodiment, this is not a limitation. For example, the map acquisition portion 103 may acquire map data that is distributed from the outside of the host vehicle (a second embodiment). The second embodiment of the present disclosure is described below with reference to the drawings.

A driving assistance system 1a according to the second embodiment is similar to the driving assistance system 1 according to the first embodiment except that the driving assistance system 1a includes a data communication module (DCM) 70 that communicates with a center 200 that is located outside the host vehicle and that the driving assistance system 1a includes no map DB 21.

Figure 10:
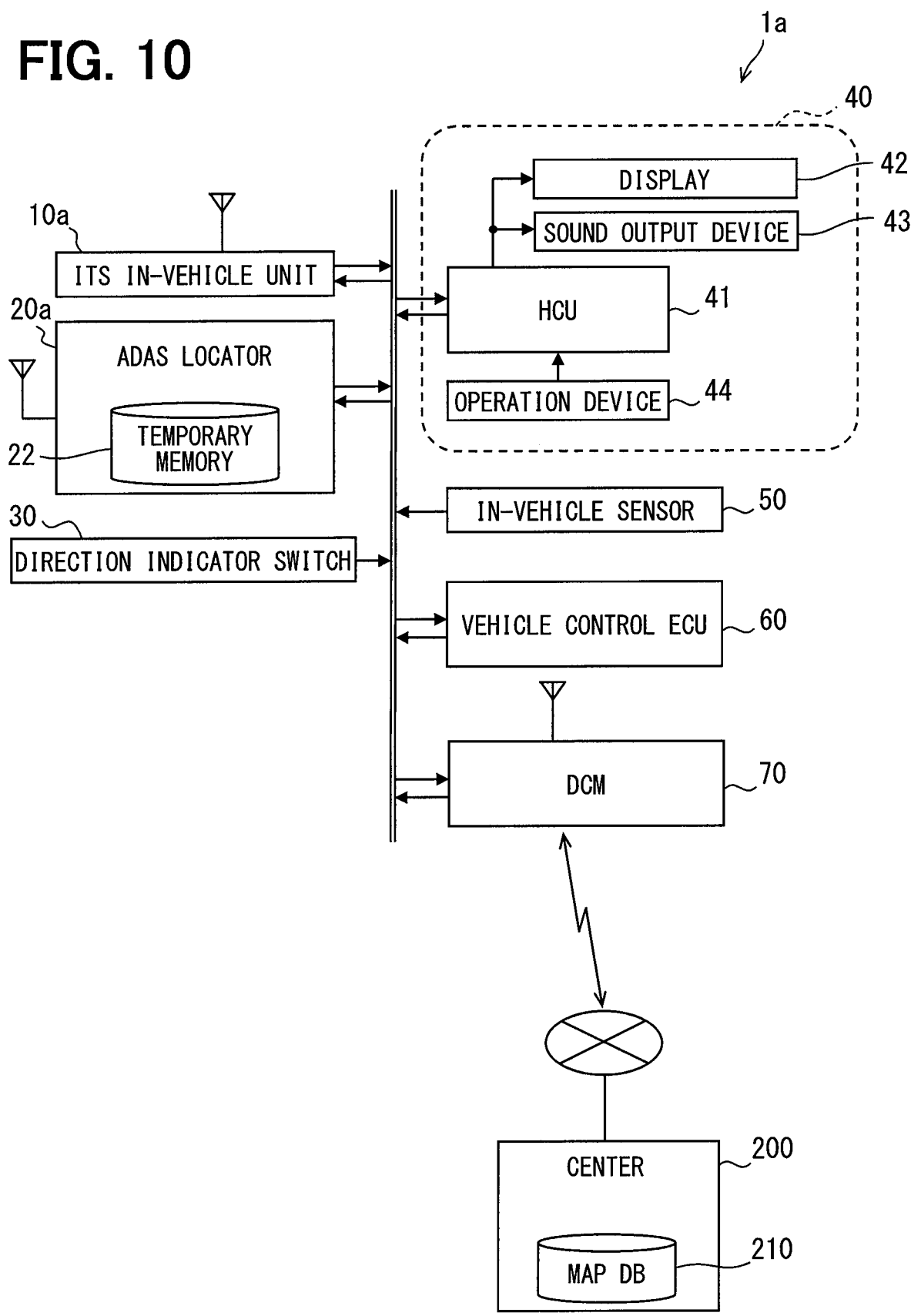
FIG. 10 is a diagram of an exemplary schematic configuration of a driving assistance system 1a according to a second embodiment.

The driving assistance system 1a illustrated in FIG. 10 is for installation in a vehicle and includes an ITS in-vehicle unit 10a, an ADAS locator 20a, a direction indicator switch 30, an HMI system 40, an in-vehicle sensor 50, a vehicle control ECU 60, and the DCM 70. The ITS in-vehicle unit 10a, the ADAS locator 20a, the direction indicator switch 30, the HMI system 40, the in-vehicle sensor 50, the vehicle control ECU 60, and the DCM 70 are connected to, for example, an in-vehicle LAN and can communicate and exchange information with each other.

The DCM 70, which is an in-vehicle communication module for use in telematics service, communicates with the center 200 via a public communication network. The center 200 is provided with a map DB 210 that is similar to the map DB 21 in the first embodiment. The DCM 70 receives map data near the host vehicle position from the map DB 21 of the center 200 and transmits the data to the ADAS locator 20a. The map data near the host vehicle position may be, for example, map data in a mesh range including the host vehicle position. The DCM 70 may sequentially receive new map data every time the host vehicle position moves into a different mesh.

The ADAS locator 20a is similar to the ADAS locator 20 according to the first embodiment except that the ADAS locator 20a includes a temporary memory 22 in place of the map DB 21. The temporary memory 22 is a volatile memory that temporarily stores the map data transmitted by the DCM 70. The ADAS locator 20a reads map data in the course of the host vehicle forward of the host vehicle from the map data near the host vehicle position temporarily stored in the temporary memory 22. The ADAS locator 20a sequentially outputs to the in-vehicle LAN the host vehicle position and the map data in the course of the host vehicle forward of the host vehicle.

The ITS in-vehicle unit 10a is similar to the ITS in-vehicle unit 10 according to the first embodiment except that a map acquisition portion 103 acquires the map data read from the temporary memory 22 in place of the map data read from the map DB 21. The ITS in-vehicle unit 10a corresponds to the driving assistance device.

While the driving assistance system 1a acquires the map data from the map DB 21 provided in the center 200 via the DCM 70 in the second embodiment, this is not a limitation. For example, the map data may be received from the map DB 21 of the center 200 via a mobile phone communication network and a mobile phone. Additionally, the map data received from the map DB 21 of the center 200 may be stored in a volatile memory of the ITS in-vehicle unit 10b in place of the temporary memory 22 of the ADAS locator 20a.

The configuration according to the second embodiment has access to the latest map data at all times and thereby can prevent a false notification even at a circular intersection that has been converted from an existing intersection. Thus, the configuration according to the second embodiment has a higher probability of preventing a false notification at a circular intersection where the host vehicle is unlikely to intersect with the other vehicle.

Third Modification

While the map acquisition portion 103 acquires map data such as the road information in the course of the host vehicle forward of the host vehicle and thereby limits the circular intersections to be processed to a circular intersection in the course of the host vehicle forward of the host vehicle in the first and second embodiments, this is not a limitation. For example, the map acquisition portion 103 may acquire map data near the host vehicle, which is not limited to that in the course of the host vehicle forward of the host vehicle. The assistance processing portion 104 may then extract from the acquired map data a circular intersection in the course of the host vehicle forward of the host vehicle as a circular intersection to be processed.

A circular intersection in the course of the host vehicle forward of the host vehicle is provided as the circular intersection to be processed in order to exclude circular intersections that are located in the course of the host vehicle rearward of the host vehicle and that the host vehicle is thus not likely to enter.

Third Embodiment

While it is determined whether a circular intersection exists in the course of the host vehicle forward of the host vehicle using map data acquired by the map acquisition portion 103 in the first embodiment, this is not a limitation. For example, the determination of whether a circular intersection exists in the course of the host vehicle forward of the host vehicle may be made based on a result of sensing performed by a perimeter monitoring sensor (a third embodiment).

<Schematic Configuration of Driving Assistance System 1b>

The third embodiment of the present disclosure is described below with reference to the drawings. A driving assistance system 1b according to the third embodiment is similar to the driving assistance system 1 according to the first embodiment except that the driving assistance system 1b includes a perimeter monitoring system 80 that monitors the perimeter of the host vehicle in place of the ADAS locator 20 and that the driving assistance system 1b includes an ITS in-vehicle unit 10b in place of the ITS in-vehicle unit 10.

Figure 11:
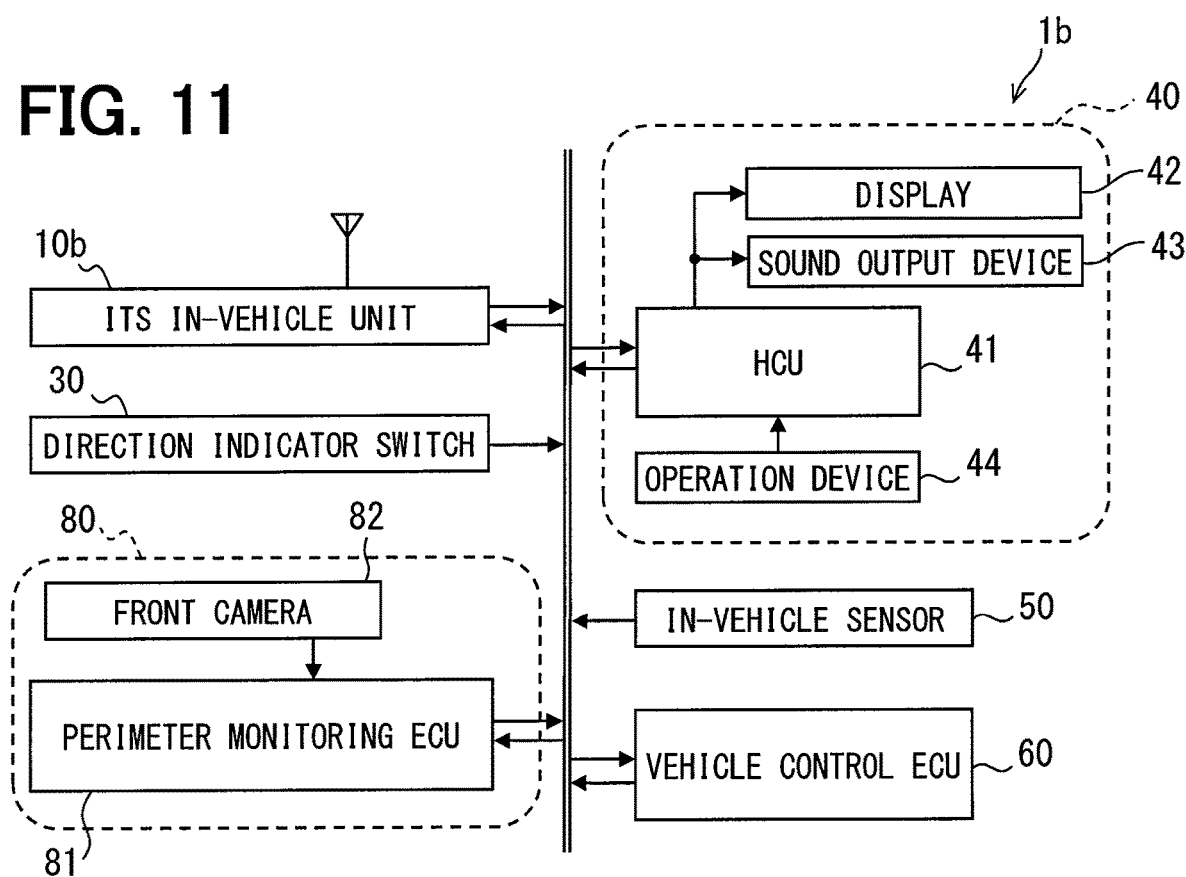
FIG. 11 is a diagram of an exemplary schematic configuration of a driving assistance system 1b according to a third embodiment.

The driving assistance system 1b illustrated in FIG. 11 is for installation in a vehicle and includes the ITS in-vehicle unit 10b, a direction indicator switch 30, an HMI system 40, an in-vehicle sensor 50, a vehicle control ECU 60, and the perimeter monitoring system 80. The ITS in-vehicle unit 10b, the direction indicator switch 30, the HMI system 40, the in-vehicle sensor 50, the vehicle control ECU 60, and the perimeter monitoring system 80 are connected to, for example, an in-vehicle LAN and can communicate and exchange information with each other.

The perimeter monitoring system 80 includes a perimeter monitoring ECU 81 and a front camera 82. The perimeter monitoring system 80 may be configured to use a perimeter monitoring sensor, such as a camera other than the front camera 82, a millimeter-wave radar, a light detection and ranging or laser imaging detection and ranging (LIDAR), and a sonar. The perimeter monitoring system 80 detects a lane line, a road marking, and a traffic sign. The perimeter monitoring system 80 may be configured to also detect a pedestrian, a non-human animal, a bicycle, a motorcycle, a movable object such as other vehicles, and obstacles such as a fallen object on the road, a guard rail, a curb, and a stationary object such as a tree.

The front camera 82, which is, for example, a monocular camera, sequentially captures an image in a predefined range forward of the host vehicle. The front camera 82 may be configured using a stereo camera. The front camera 82 is placed, for example, on an inner rear-view mirror with its optical axis facing the road surface forward of the host vehicle. The front camera 82 has, for example, a horizontal angle of view of about 45 degrees and captures an image in a range of about 80 meters from the host vehicle. The front camera 82 outputs data of a sequentially-captured image sequentially to the perimeter monitoring ECU 81.

The perimeter monitoring ECU 81, which includes a CPU, a volatile memory, a nonvolatile memory, an I/O, and a bus that connects these components, executes a variety of operations by performing control programs stored in the nonvolatile memory. The functions executed by the perimeter monitoring ECU 81 may be in whole or in part configured in the form of hardware using one or more ICs or the like.

The perimeter monitoring ECU 81 recognizes a sign that indicates that there is a circular intersection in the data of the captured image acquired from the front camera 82 using a publicly known image recognition technique. The perimeter monitoring ECU 81 corresponds to a recognition device. The perimeter monitoring ECU 81 may be configured to recognize the sign indicating that there is a circular intersection by, for example, matching the sign with its characteristic pattern that is registered in an image recognition dictionary.

Figure 12:
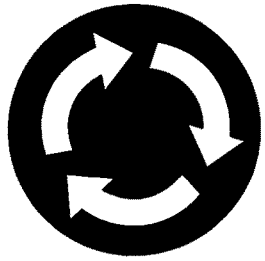
FIG. 12 is a diagram of an example sign indicating that there is a circular intersection for a region that requires vehicles to be driven on the left-hand side of the road.
Figure 13:
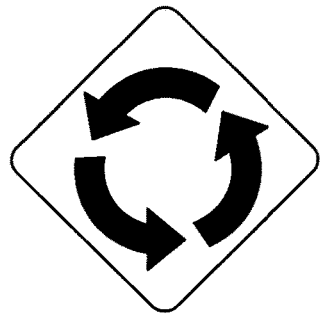
FIG. 13 is a diagram of an example sign indicating that there is a circular intersection for a region that requires vehicles to be driven on the right-hand side of the road.

The characteristic pattern of the sign indicating that there is a circular intersection includes, for example, a series of three arc-shaped arrows placed clockwise as illustrated in FIG. 12. The example illustrated in FIG. 12 correspond to a sign for a region that requires vehicles to be driven on the left-hand side of the road. The sign indicating that there is a circular intersection is as illustrated in FIG. 13 for a region that requires vehicles to be driven on the right-hand side of the road. A pattern including a series of three arc-shaped arrows placed counterclockwise may be registered in the image recognition dictionary in the region that requires vehicles to be driven on the right-hand side of the road.

<Schematic Configuration of ITS In-Vehicle Unit 10b>

Figure 14:
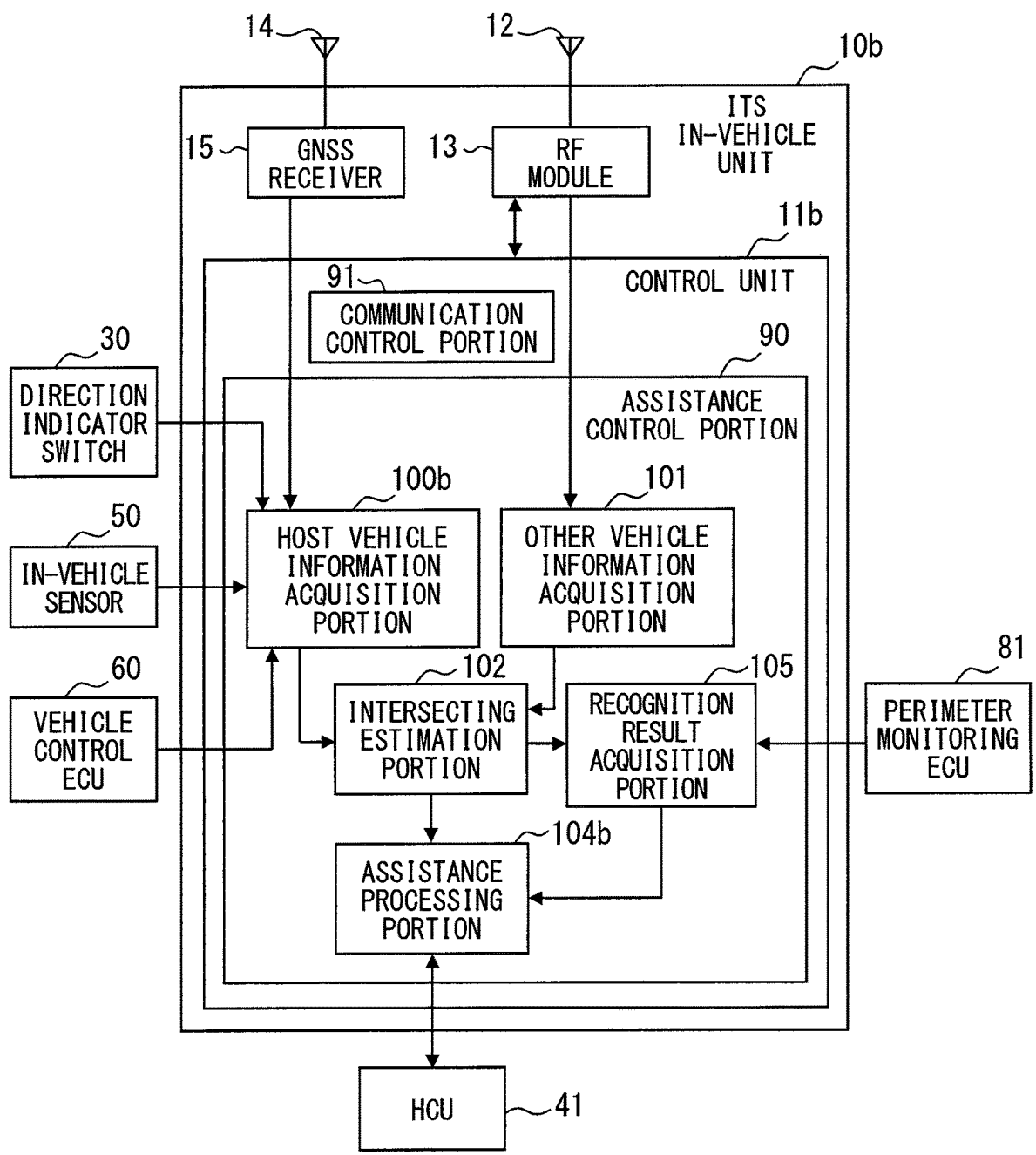
FIG. 14 is a diagram of an exemplary schematic configuration of an ITS in-vehicle unit 10b according to the third embodiment.

A schematic configuration of the ITS in-vehicle unit 10b is described below with reference to FIG. 14. As illustrated in FIG. 14, the ITS in-vehicle unit 10b includes a control unit 11b, an RF antenna 12, an RF module 13, a GNSS antenna 14, and a GNSS receiver 15. The GNSS receiver 15 is connected to the GNSS antenna 14.

The GNSS antenna 14 transmits to the GNSS receiver 15 an electric signal that corresponds to a radio wave received from a positioning satellite. The GNSS receiver 15 receives a positioning signal transmitted by the positioning satellite via the GNSS antenna 14. The control unit 11b is similar to the control unit 11 according to the first embodiment except that the control unit 11b includes an assistance control portion 90b in place of the assistance control portion 90.

<Schematic Configuration of Assistance Control Portion 90b>

A schematic configuration of the assistance control portion 90b is described below with reference to FIG. 14. As illustrated in FIG. 14, the assistance control portion 90b includes a host vehicle information acquisition portion 100b, an other vehicle information acquisition portion 101, an intersecting estimation portion 102, an assistance processing portion 104b, and a recognition result acquisition portion 105 as functional blocks.

The host vehicle information acquisition portion 100b acquires the vehicle information of the host vehicle from the GNSS receiver 15, the direction indicator switch 30, the in-vehicle sensor 50, the vehicle control ECU 60, and the like. The host vehicle position is acquired by combining a positioning signal acquired from the GNSS receiver 15 and a measurement result of an inertial sensor, which is an in-vehicle sensor 50 such as an acceleration sensor and a gyro sensor, and by sequentially determining the position of the host vehicle.

The recognition result acquisition portion 105 acquires a result of recognition, performed by the perimeter monitoring ECU 81, of the sign indicating that there is a circular intersection (hereinafter referred to as a sign recognition result). The assistance processing portion 104b disables the notification that the host vehicle is likely to intersect with another vehicle if the recognition result acquisition portion 105 acquires a sign recognition result indicative of successful recognition of the sign indicating that there is a circular intersection.

<Intersection Assistance Related Processing in the Third Embodiment>

Figure 15:
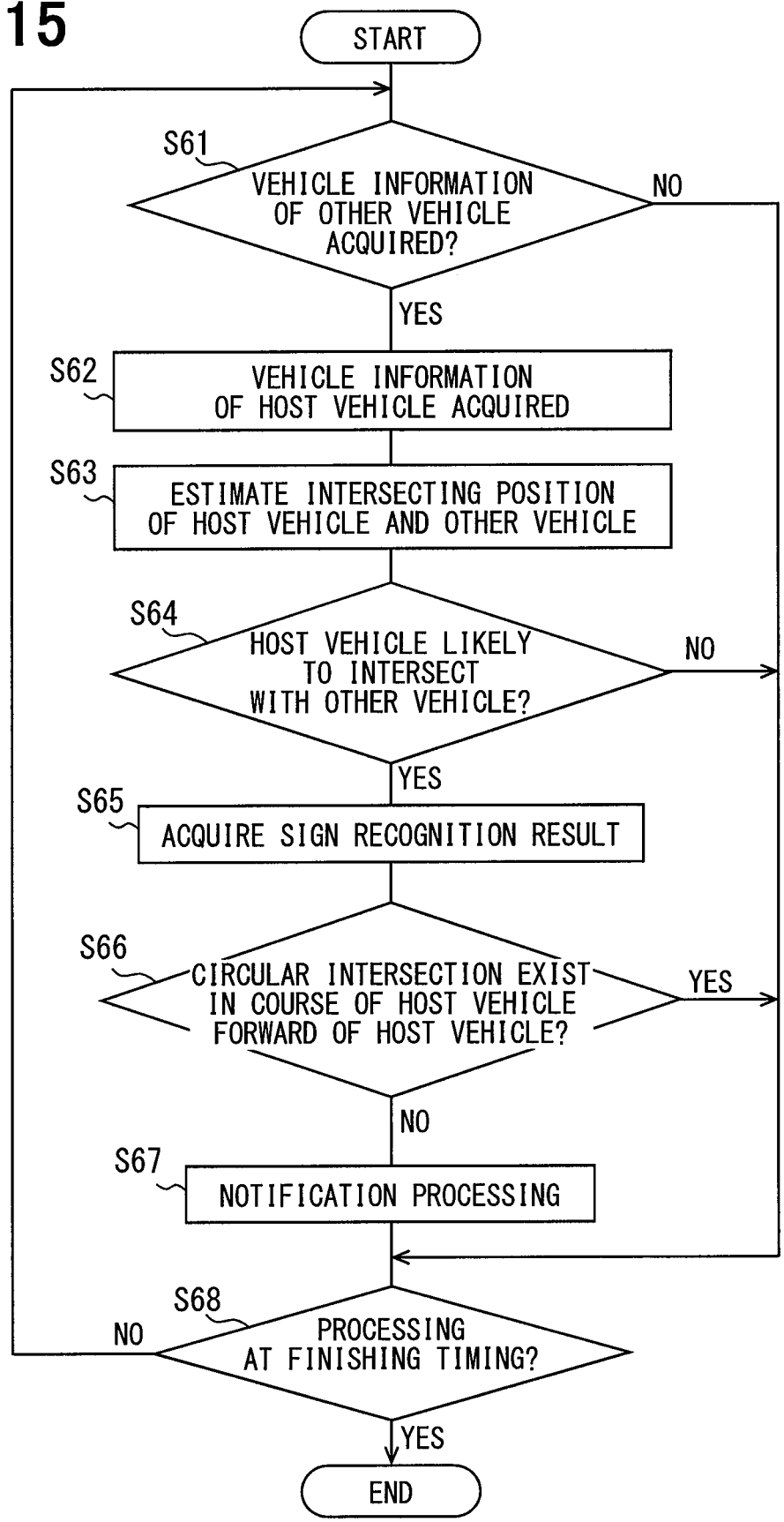
FIG. 15 is a flowchart illustrating an exemplary flow of intersection assistance related processing performed by an assistance control portion 90b *according to the third embodiment*.

An exemplary flow of intersection assistance related processing, which is performed by the assistance control portion 90b, according to the third embodiment is described below with reference to a flowchart in FIG. 15. The flowchart in FIG. 15 may start when the ignition of the host vehicle is turned on to activate the ITS in-vehicle unit 10 as in the case with the flowchart in FIG. 3.

Parts of the processing from step S61 to S64 and from step S67 to S68 are similar to those from S1 to S4 and from S7 to S8 described above.

In step S65, the recognition result acquisition portion 105 acquires a sign recognition result from the perimeter monitoring ECU 81. In step S66, the assistance processing portion 104b determines whether a circular intersection exists in the course of the host vehicle forward of the host vehicle on the basis of the sign recognition result, acquired by the recognition result acquisition portion 105, indicative of successful recognition of the sign indicating that there is a circular intersection. For example, the assistance processing portion 104b may determine that a circular intersection exists in the course of the host vehicle forward of the host vehicle if the recognition result acquisition portion 105 acquires a sign recognition result indicative of successful recognition of the sign indicating that there is a circular intersection. The assistance processing portion 104b may determine that no circular intersection exists in the course of the host vehicle forward of the host vehicle if the recognition result acquisition portion 105 acquires a sign recognition result indicative of unsuccessful recognition of the sign indicating that there is a circular intersection.

If it is determined that a circular intersection exists in the course of the host vehicle forward of the host vehicle (yes in S66), the flowchart proceeds to step S68. Otherwise (no in S66), the flowchart proceeds to step S67.

Conclusion of The Third Embodiment

In the third embodiment, the notification of the likelihood of the host vehicle intersecting with another vehicle is disabled on the basis of the determination made by the assistance processing portion 104b that a circular intersection exists in the course of the host vehicle forward of the host vehicle, as in the case with the first embodiment. Thus, this configuration can prevent a false notification at a circular intersection where the host vehicle is unlikely to intersect with the other vehicle.

The use of the front camera 82 to recognize a sign indicating that there is a circular intersection is not a limitation. For example, other types of perimeter monitoring sensor may be used. For example, a LIDAR having a sensing range in an area forward of the host vehicle may be used. When the LIDAR is used, the perimeter monitoring ECU 81 may be configured to recognize a sign indicating that there is a circular intersection by matching the sign, based on a reflected signal from the sign, with its characteristic pattern that is registered in an image recognition dictionary.

Fourth Modification

While the ITS in-vehicle units 10, 10a, and 10b are configured in the first to third embodiments to perform the notification processing that includes providing a notification of the host vehicle, which is to turn to a direction that crosses the opposite lane, intersecting with another vehicle and providing a notification of the host vehicle, which is to move straight, intersecting with another vehicle, this is not a limitation. For example, the ITS in-vehicle units 10, 10a, and 10b may be configured to provide one of the notifications.

Fifth Modification

While the ITS in-vehicle units 10, 10a, and 10b are configured in the first to third embodiments to acquire the vehicle information of another vehicle using the vehicle-to-vehicle communication, this is not a limitation. For example, the ITS in-vehicle units 10, 10a, and 10b may be configured to acquire the vehicle information of another vehicle transmitted by a roadside unit provided on a roadside or on a road using road-to-vehicle communication (fifth modification).

The ITS in-vehicle units 10, 10a, and 10b may receive, using the road-to-vehicle communication, the vehicle information of another vehicle that has been received by a roadside unit from a wireless communication unit of the other vehicle and relayed by the roadside unit. Alternatively, the ITS in-vehicle units 10, 10a, and 10b may receive, using the road-to-vehicle communication, the vehicle information of another vehicle that has been detected by a sensor such as a camera and a radar included in a roadside unit and transmitted by the roadside unit.

The configuration of the fifth modification is similar to that of the first embodiment in that the vehicle information of another vehicle is acquired using wireless communication; thus, the fifth modification produces an effect similar to that of the first embodiment.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A driving assistance device for a vehicle, the device driving assistance comprising:

a computer having a processor and configured to
execute a notification of a possibility of a host vehicle intersecting with an other vehicle based on host vehicle information and an other vehicle information, the host vehicle information being vehicle information including information that provides an estimation of a travelling course of the host vehicle and a position of the host vehicle, and the other vehicle information being vehicle information including information that provides an estimation of a travelling course of the other vehicle and being acquired by wireless communication;
acquire map data including data that specifies a circular intersection; and
estimate an intersecting position at which the host vehicle intersects with the other vehicle, estimation of the intersection position based on the host vehicle information and the other vehicle information, wherein
the computer is further configured to prevent the notification from being output in response to a determination that (i) the circular intersection is disposed in front of the host vehicle and in the course of travel of the host vehicle, and (ii) a distance between the circular intersection and the intersecting position is less than a threshold value, the determination based on the intersecting position and the map data.

2. The driving assistance device according to claim 1, wherein:
the other vehicle information includes a position of the other vehicle; and
the determination further includes (iii) that the circular intersection is between the host vehicle and the other vehicle, the determination further based on the host vehicle information and the other vehicle information.

3. The driving assistance device according to claim 1, wherein
the computer is further configured to acquire the map data from a map database provided in the host vehicle.

4. The driving assistance device according to claim 1, wherein
the computer is further configured to acquire the map data that is distributed from a map database provided in an information center outside the host vehicle.

5. The driving assistance device according to claim 1, wherein
the computer is further configured to execute the notification in response to the host vehicle turning and crossing an opposite traffic lane.

6. The driving assistance device according to claim 1, wherein
the computer is further configured to execute the notification in response to the host vehicle traveling straight.

7. A driving assistance device for a vehicle, the driving assistance device comprising:
a computer having a processor and configured to
execute a notification of a possibility of a host vehicle intersecting with an other vehicle based on host vehicle information and an other vehicle information, the host vehicle information being vehicle information including information that provides an estimation of a travelling course of the host vehicle and a position of the host vehicle, and the other vehicle information being vehicle information including information that provides an estimation of a travelling course of the other vehicle and being acquired by wireless communication;
acquire a recognition result performed by a recognition device, the recognition device configured to recognize a traffic sign indicating that a circular intersection is disposed in front of the host vehicle and in the travelling course of the host vehicle and to output the recognition result, acquisition of the recognition result based on a sensing result performed by a perimeter monitoring sensor that monitors a predetermined range in front of the host vehicle; and
estimate an intersecting position at which the host vehicle intersects with the other vehicle, estimation of the intersection position based on the host vehicle information and the other vehicle information, wherein
the computer is further configured to prevent the notification from being output in response to acquiring the recognition result and a determination that a distance between the circular intersection and the intersecting position is less than a threshold value, the determination based on the intersecting position.

8. The driving assistance device according to claim 7, wherein
the computer is further configured to execute the notification in response to the host vehicle turning and crossing an opposite traffic lane.

9. The driving assistance device according to claim 7, wherein
the computer is further configured to execute the notification in response to the host vehicle traveling straight.

* * * * *